(12) United States Patent
Jensen et al.

(10) Patent No.: US 8,282,978 B1
(45) Date of Patent: *Oct. 9, 2012

(54) EMULSIFIED BEAN-BASED OIL SUBSTITUTE

(75) Inventors: Peter Dennis Jensen, Blackfoot, ID (US); Henry J. Camin, Pocatello, ID (US); Paul William Gover, Bayfield, WI (US); Dennis Salvatore Greco, Custer, WI (US)

(73) Assignee: Basic American, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/016,577

(22) Filed: Jan. 28, 2011

Related U.S. Application Data

(63) Continuation of application No. 11/744,155, filed on May 3, 2007, now Pat. No. 7,879,385, which is a continuation-in-part of application No. 10/967,111, filed on Oct. 14, 2004, now Pat. No. 7,413,762.

(51) Int. Cl.
*A23L 1/20* (2006.01)
(52) U.S. Cl. ........ 426/634; 426/518; 426/519; 426/602; 426/604; 426/804
(58) Field of Classification Search .................. 426/602, 426/604, 634, 518, 519, 804
See application file for complete search history.

(56) References Cited

U.S. PATENT DOCUMENTS

| | | |
|---|---|---|
| 4,676,990 A | 6/1987 | Huffman et al. |
| 5,980,971 A | 11/1999 | Walsh |
| 6,485,775 B1 | 11/2002 | Camin et al. |
| 7,074,444 B2 | 7/2006 | Margolis |

FOREIGN PATENT DOCUMENTS

EP 19940308136 5/1995

OTHER PUBLICATIONS

Meilgaard et al., Sensory Evaluation Techniques, 3$^{rd}$ ed. CRC Press, Chapter 12, pp. 241-249 (1999).
Zelayeta, Elena 1962 Elena's Secrets of Mexican Cooking, Prentice-Hall, Inc, Englewood Cliffs, N. J, pp. 106, 107.
Jones, D. The Soybean Cookbook, Arco Publishing Co., Inc., New York, N,Y., p. 107, 1962.

*Primary Examiner* — Helen F Heggestad
(74) *Attorney, Agent, or Firm* — Richard F. Trecartin; David J. Brezner; Morgan, Lewis & Bockius LLP

(57) ABSTRACT

A method for making a bean-based oil substitute comprising the steps of making an aqueous liquid dispersion of comminuted beans in a stable flowable form, homogenizing said aqueous dispersion, and mixing an emulsifier with said comminuted beans before, during or after homogenization, said homogenized aqueous dispersion including less than about 2% weight of added oil, and drying the dispersion. Also, the substitute made by the method and a dehydrated refried bean product made using the oil substitute.

17 Claims, 2 Drawing Sheets

EMULSIFIED BEAN-BASED OIL SUBSTITUTE

CROSS REFERENCE TO RELATED APPLICATION

This application is a continuation of U.S. application Ser. No. 11/744,155 filed May 3, 2007, now U.S. Pat. No. 7,879,385, which is a continuation-in-part of U.S. application Ser. No. 10/967,111 filed Oct. 14, 2004 now U.S. Pat. No. 7,413,762.

BACKGROUND OF THE INVENTION

Refried beans may be supplied to restaurants in dehydrated form for subsequent rehydration into refried beans in the restaurant. In one process for making such dehydrated beans disclosed in Huffman, et al. U.S. Pat. No. 4,676,990, beans are mixed with lard and flavoring followed by cooking and extrusion into pellets which are dried into dehydrated pellets. Other products substitute a vegetable oil such as a hydrogenated corn oil for the lard in this process. The dried pellets typically include about 9% oil. Vegetable oil is relatively expensive. Also, many consumers wish to minimize oil consumption in their diets. Thus, there is a need to provide dehydrated refried beans with reduced oil content and characteristics comparable to the conventional product.

SUMMARY OF THE INVENTION

In one embodiment of the invention, a method is provided for making a bean-based oil substitute comprising the steps of (a) making an aqueous liquid dispersion of comminuted beans in a stable flowable form, (b) homogenizing said aqueous dispersion, and (c) mixing an emulsifier with said comminuted beans before, during or after homogenization, said homogenized aqueous dispersion including less than about 2% weight of added oil.

Another embodiment of the invention is a bean-based oil substitute comprising homogenized comminuted beans in a stable aqueous liquid dispersion of water and an emulsifier with an added oil content, if any, less than about 2%.

Another embodiment is a bean product comprising homogenized comminuted beans in a stable aqueous liquid dispersion of emulsifier and water, in admixture with cooked beans formed into desired shapes and dried into a product suitable for use as dehydrated refried beans, in which the total emulsifier content of said dehydrated refried bean product is at least about 0.1 wt %.

DETAILED DESCRIPTION OF PREFERRED EMBODIMENTS

In general, the present invention relates to a bean-based oil substitute, particularly one for use in dehydrated refried beans, and to a method of making the substitute and its use in refried beans. As used herein, the term "bean-based oil substitute" means a bean-based produce that can replace part or all of the oil used in a food product such as dehydrated refried beans. Thus, the term encompasses an oil extender or replacer.

Figure 1:
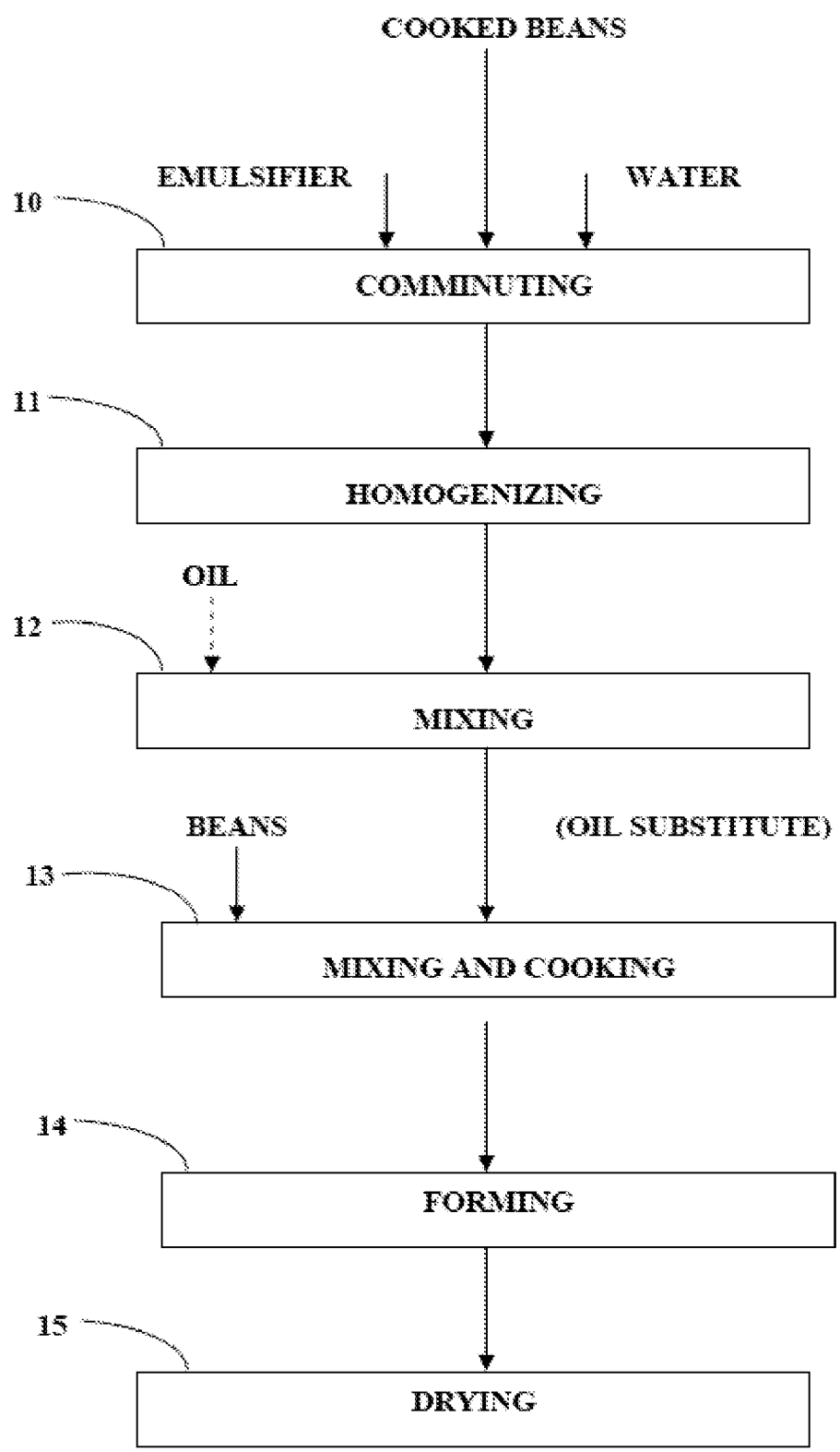
FIGS. 1 and 2 are flow diagrams illustrating the method of the present invention.

Steps 10, 11 and 12 of FIG. 1 relate to the making the bean-based oil substitute of the present invention. Steps 13, 14 and 15 refer to the use of the oil substitute in place of conventional oil in the making of dehydrated refried beans.

Referring to step 10, in one embodiment, cooked beans are comminuted in water to form a flowable aqueous suspension of the cooked beans. As used herein, the term "cooked beans" in step 10 means beans which have been cooked at least once and may be used in step 10 prior to dehydration or after dehydration and rehydration. Thus, the cooked beans in step 10 can be supplied from a variety of sources. In one embodiment, the cooked beans are dehydrated beans such as ones supplied in dehydrated form by Basic American, Inc. to the foodservice restaurant trade. Such beans can be made by soaking dry beans in hot water to hydrate the beans, mixing the hydrated beans with oil, cooking, and forming the beans into pellets by extrusion, and drying the pellets. The general procedure described in steps 13, 14 and 15 may be used to make the dehydrated beans supplied as the cooked beans in step 10. Optionally, conventional vegetable oil or an oil substitute may be mixed with the beans during this process.

An alternative source of the cooked beans in step 10 is the dehydrated product formed by the method described in U.S. Pat. No. 4,676,990. In that patent, lard is used instead of oil.

In other alternatives, the cooked beans can be cooked fresh beans or dried beans not previously dehydrated which are soaked for rehydration. Further, the cooking may be performed prior to, during or after comminution.

In comminution step 10, the cooked beans are mixed with water in a comminution mixing tank to form a liquefied flowable slurry of the comminuted cooked beans in water. In the embodiment where the beans are dehydrated pellets that are mixed with water, the water preferably is heated to accelerate rehydration of the beans in the water to form a flowable slurry. Preferably, the beans are rehydrated prior to the homogenization step 11 to be described hereinafter.

In one form of comminution in step 10, dehydrated beans are rehydrated and "liquefied", i.e. formed into a flowable slurry, by shearing. In one embodiment, the beans and water are supplied to a tank and flow out the tank outlet through a shear pump which liquefies the beans. The outlet of the shear pump may be split with a portion recirculating to the mixing tank and another portion passing to homogenization step. 11.

Prior to homogenization, it is preferable to swell the cells of the cooked beans by heating in water containing an emulsifier, prior to, during or after comminution, and before homogenization. Thus, the bean slurry in the comminution mixing tank in step 10 may be heated to an elevated temperature, e.g., 145° F. to 200° F., preferably 170° F. to 180° F., as by use of a steam jacket around the tank.

Suitably, prior to homogenization, the beans are comminuted to a size which will permit the beans to flow in a relatively low viscosity slurry-like suspension to the homogenization step. Suitable comminution conditions can be attained by flow through a shear pump or mixer operating at 3500 rpm.

In another embodiment, not shown, the beans may be comminuted in a dry form followed by mixing with water to form a slurry. In this embodiment, it is preferable to hydrate the beans prior to homogenization. It is believed that this disrupts at least some of the lipid bonds in the monomolecular layer encapsulating the bean micelles.

In yet another embodiment, the cooked beans may be comminuted prior to full hydration. A suitable apparatus for performing comminution in this embodiment is the same kind of shear pump described above or standard grinder or mill.

The ratio of the water to the beans may vary over a wide range. The ratio may affect the homogenization efficiency and the desired properties of the oil substitute form in step 12. For example, high viscosity slurries may be difficult to transport or pump to the homogenizer. On the other hand, if the bean solids are too low this may adversely affect the stability of the dispersion of the present invention. Suitably, the water/bean mixture includes from above 5 to 25% beans and 95 to 75% water, preferably from 12 to 15% beans and 88 to 85% water. (All percentages expressed herein are on a weight basis.)

As illustrated, the emulsifier is added in step 10. However, emulsifier may be added before, during or after homogenization step 11 so long as it is present in the bean-based oil substitute when mixed with the beans in step 13.

In step 11, the comminuted cooked beans flow in an aqueous dispersion to a homogenizer. The conditions of homogenization are analogous to the conditions of homogenization of hydrated or swollen potato granules as described in U.S. Pat. No. 6,485,775. The pressures applied during homogenization may be as low as 1,000, 3,000 or 5,000 psig. Preferably, the pressures are in excess of 5,000 psig and more preferably in excess of 6,000, 7,000, 8,000, 8,500, 9,000, 10,000, 11,000, 12,000, 13,000, 14,000, 15,000, 18,000, 20,000 psig or more. Suitable homogenizers and conditions of homogenization are described in the 775 patent. As used herein, the term "homogenization" means reduction of the particle size of the beans in water to create a mixture comprised of small particles typically characterized by a relatively uniform texture and composition. Typically, the product has an oily tactile feel, even in the absence of oil, due to the presence of the microscopic-sized homogenized bean particles. Preferably, during homogenization, the bean cell walls have been ruptured.

In an alternative embodiment, not shown, the particles may be comminuted and homogenized simultaneously.

As illustrated in optional step 12, the comminuted, homogenized beans in water containing emulsifier may be mixed with a small amount (e.g. less than 2% preferably less than 1.5%, 1.0%, 0.5%, 0.3% or less) of added edible oil. It may be preferable to exclude any substantial amount of added oil for certain applications. The mixture forms a flowable oil substitute in the form of a stable dispersion of the comminuted beans dispersed in water and an emulsifier. In an alternative embodiment, not shown, the edible oil may be mixed with the comminuted beans and water prior to or during homogenization. However, this will increase the volume of liquid flowing through the homogenizer which leads to additional required capacity for the homogenizer.

It is believed that the homogenate serves as a functional emulsifier as determined by its ability to hold oil in a stable dispersion without noticeable separation of the oil from the water. This functional property provides a sensory benefit in the finished product similar to a fat mimetic which results in a product with the sensory perception of a higher oil product but in a lower oil format. The conditions of mixing in step 12 can affect the stability of the dispersion. It is preferable to shear the mixture under sufficient energy to create fine oil droplets to assist in creating a stable dispersion.

This bean-based oil substitute is preferably used as a substitute or replacement of the vegetable oil used in a conventional dehydrated refried bean process described above and as described in steps 13, 14 and 15 below using the oil substitute in place of part of the vegetable oil used in a conventional product.

The emulsifier is added to the bean-water mixture in steps 10, 11 and/or 12 to facilitate formation of an emulsion. The amounts of emulsifier may vary over a wide range depending on the amount of beans and oil, if any, in the aqueous dispersion. Typically, the concentration of emulsifier is greater than 0.5%, 1.0%, 3.0%, to as high as 10.0% or more based on the water content of the dispersion.

Any of the well-known food grade emulsifiers may be used. Suitable emulsifiers include monoglycerides, mixtures of mono- and diglycerides, and derivatives thereof, including DATEM (diacetyl tartaric acid esters of mono- and diglycerides).

Mono- and diglycerides derived from either vegetable or animal fats typically consist of a mixture of predominantly saturated acyl fatty acids including lauric, palmitic, stearic, myristic in combination with unsaturated acyl fatty acids, including oleic, eladic, linoleic and combinations thereof. Mono- and diglycerides typically have a monoglyceride content equal to or grater than 40%, preferably greater than 60% and most preferably 90%. In the production of monoglycerides, a triglyceride normally is reacted with glycerol to form a mixture of mono and diglycerides. This process can be carried further to isolate or to concentrate the monoglyceride fraction by molecular distillation. The remaining components, predominantly di and triglycerides are typically recycled back to the reaction with glycerol to make additional monoglyceride. Any emulsifier used can be at a relatively low concentration, e.g. from 0.1% to 2.0% or more based on the bean solids in the finished product.

While not intending to be limiting, the desirable emulsion-like characteristics of the present product are believed to be accomplished by disrupting the bean cell walls and breaking them into very small particles.

In step 11, a suitable weight ratio of homogenized beans:emulsifier:water is from 6% to 25%, preferably from 11% to 18% beans; 0.5% to 15% emulsifier, preferably 2% to 9% emulsifier; and from 60 to 93.5%, preferably 73 to 87% water. The concentration of beans preferably is high enough to provide the desired functional properties, but not so high that the resultant emulsion is unpumpable. The amount of emulsifier is dictated by the sensory properties desired in the finished product. Water is primarily used as a carrier.

Suitable edible oils for use in optional step 12 are the oils used to make refried beans, typically a vegetable oil such as hydrogenated or unhydrogenated corn oil. Other suitable edible oils include food grade vegetable or other types of oils, including soybean oil, coconut oil, cottonseed oil, sunflower oil, palm oil, canola oil, corn oil, olive oil, rendered fat, lard, or combinations thereof.

In optional step 12, the oil and homogenized bean dispersion can be made by mixing in a similar way to the comminution mixing step 10 described above. Thus, the mixture may be recycled to a mixing tank through a shear pump with a portion of the recycle drawn off as the bean-based oil substitute of the present invention.

Steps 13, 14 and 15 are one conventional process for making dehydrated refried beans except for the use of the oil substitute.

Referring to step 13, the oil substitute product from step 12 is mixed with beans and processed as in a conventional process for producing dehydrated refried beans. In such process, beans, typically dried pinto beans, are soaked n water at elevated temperature to swell them. Suitable presoaking conditions are 180° F. for 15 to 20 minutes. Thereafter, the presoaked beans may be cooled as in tap water and drained.

The beans may be mixed with the oil substitute from step 12 and cooked during mixing. Alternatively, the beans may be cooked before or after mixing. Suitable mixing conditions for the oil substitute and beans include any conventional means such as mixers, tumblers, or the like.

Alternatively, fresh or cooked undried beans could be used. If the beans are not cooked, in step 13 the beans may be cooked while mixing. Suitable mixing conditions can be accomplished in a rotating pressure cooker. Beans may be cooked during mixing or before or after mixing. The conditions of cooking are conventional such as for a time of 44 minutes at 256° F.

Suitable additional ingredients which may be added in or prior to step 13 include flavoring ingredients such as dendritic salt (e.g., at a concentration of 1 to 5% based on the beans) and also, if desired, additional oil.

In step 14, the mixture of step 13 is formed into the desired pellet form as by extrusion. Suitable, the size of the pellets are ⅛ to ⅜ inch in diameter and random length. Then the product is dried in step 15. Steps 14 and 15 can be accomplished using the conditions set form in Huffman U.S. Pat. No. 4,676,990.

The dried product typically has a moisture content of about 4% to 10%. The dried pellets exiting from step 15 are similar to conventional dehydrated refried beans except for the use of the oil substitute. A suitable oil content in the pellets is below the conventional oil content of 9%, that is, less than 8%, 7%, 6%, 5%, 4%, 3%, 2%, 1% or less. In one embodiment, the dried pellets have no substantial added oil, e.g. less than 1%, 0.5%, 0.1% of added oil. The functions of the homogenate include substitution for the oil used in a conventional product, and enhancement of the reconstituted yield capability in the finished refried bean product.

Suitable added emulsifier in the dried product is from at least 0.1%, 0.2%, or 0.4%, to as high as 2% or more.

The bean-based oil substitute provides the sensory benefit in the finished product of a fat mimetic which results in a product with the sensory perception of a higher oil product but in a lower oil format.

The above dehydrated refried bean product typically has an improvement in rehydration ratio or yield compared to a conventional refried bean product due to the replacement of part of the oil with bean solids. Percent increase in yield may be in excess of 1%, 2%, 3%, 4%, 5%, 6% or more to achieve the standard refried bean viscosity. For example, a conventional dehydrated refried bean product typically has a rehydration ratio of approximately 2.97 to achieve this standard refried bean viscosity. One product of this invention has an approximate rehydration ratio of about 3.3 to achieve the same standard refried bean viscosity. The net effect is that with the product of the current invention, about 15% less dehydrated product can be packed in a bag for reconstitution with the same amount of water. This results in about an 11% improvement in rehydration ratio or reconstituted yield. Thus, a dehydrated refried bean product according to the present invention has a rehydration ratio in excess of 2.97, preferably in excess of 3.0, 3.1, 3.2, 3.25, 3.3, or more.

In order to illustrate the present invention, a non-limiting example of its practice is given.

Example 1

Figure 2:
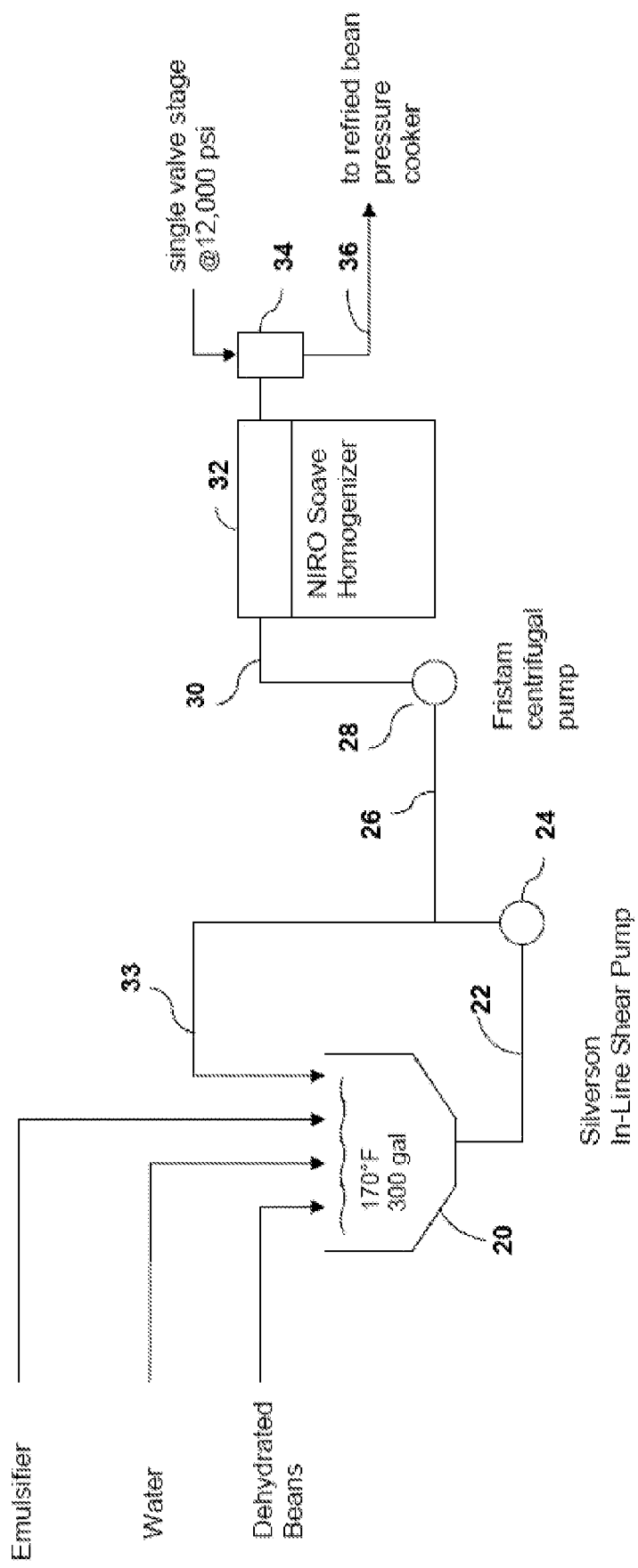

This example illustrates performing the method of FIG. 2 for making the emulsified bean slurry of steps 10 and 11 of FIG. 1. A bean/water slurry is formed by weighing 1.5 pounds/minute of dehydrated refried beans through a bean feeder and metering 8.5 pounds/minute of hot water (170° F.) into the rehydration tank 20 together with 0.42 pounds/minute of emulsifier (Panodan 150K, supplied by Danisco)

This slurry is continuously circulated in line 22 through a Silverson 275LS shear pump mixer 24 with a general purpose disintegrating screen at a rate of approximately 50 pounds/minute in line 26. A partial stream (10 pounds/minute) of the sheared refried bean slurry is pumped by a Fristam centrifugal pump 28 in line 30 to a Niro Soavi homogenizer 32 with a single valve stage 34 at a 12,000 psi operating pressure. The remainder of the output from mixer 24 (about 40 pounds/minute) is recirculated in line 33 to tank 20. The homogenate from homogenizer 32 in emulsified form is discharged in line 36 as a stable dispersion and is directed to a refried bean pressure cooker.

Then, refried beans are made in a continuous process using this homogenized bean/emulsifier stable aqueous dispersion. In this process raw beans are washed and transferred to a vessel where they are soaked at 180° F. for 30 minutes. These soaked beans (1,800 pounds), salt (30 pounds), and the emulsion from line 36 (100 pounds) are pumped into a pressurized kettle. The beans are then cooked in the kettle at 255° F. for 30 minutes. Once the beans are cooked, they are removed from the cooker and extruded through a die plate with ⅜ inch openings onto a Proctor Dryer where they are dried to about 6.5% moisture content. The total oil content in the beans is about 1%.

What is claimed is:

1. A bean product comprising homogenized comminuted beans in a stable aqueous liquid dispersion of emulsifier and water, in admixture with cooked beans formed into desired shapes and dried into a product suitable for use as dehydrated refried beans, in which the total emulsifier content of said dehydrated refried bean product is at least 0.1 wt %.

2. The bean product of claim 1 wherein said total emulsifier content of said dehydrated refried bean product is at least 0.2 wt %.

3. The bean product of claim 1 wherein said total emulsifier content of said dehydrated refried bean product is at least 0.4 wt %.

4. The bean product of claim 1 further comprising added edible oil at less than about 8%.

5. The bean product of claim 1 wherein the moisture content of said product is about 4 wt % to 10 wt %.

6. The bean product of claim 1 having a rehydration ratio in excess of 2.97.

7. The bean product of claim 1 having a rehydration ratio in excess of 3.1.

8. A method for making a bean-based oil substitute comprising the steps of
   (a) making an aqueous liquid dispersion of comminuted beans in a stable flowable form,
   (b) homogenizing said aqueous dispersion, and
   (c) mixing an emulsifier with said comminuted beans before, during or after homogenization, said homogenized aqueous dispersion including less than about 2% weight of added oil to make said bean-based oil substitute.

9. The method of claim 8 in which said emulsifier is mixed with said comminuted beans before homogenization of said beans.

10. The method of claim 8 in which said beans are comminuted prior to homogenization and said emulsifier is mixed with said beans prior to or during homogenization.

11. The method of claim 10 in which said emulsifier is mixed with said beans prior to homogenization.

12. The method of claim 8 in which beans are cooked, dehydrated, rehydrated and comminuted, to make said comminuted beans.

13. The method of claim 8 in which said aqueous liquid dispersion of comminuted beans of step (a) is directed in a flowable stream to a homogenizer for said homogenizing step.

14. The method of claim 8 in which said homogenized aqueous dispersion excludes added oil.

15. The method of claim 8 in which said oil substitute comprises about 67% to 91.5% water, about 8% to 25% comminuted beans, and about 0.5% to 8% emulsifier.

16. An oil substitute made by the method of claim 8.

17. An oil substitute made by the method of claim 14.

* * * * *